(12) United States Patent
Forkosh

(10) Patent No.: US 7,942,011 B2
(45) Date of Patent: May 17, 2011

(54) SYSTEM AND METHOD FOR MANAGING WATER CONTENT IN A FLUID

(75) Inventor: Dan Forkosh, Atlit (IL)

(73) Assignee: DUCool Ltd., Kibbutz HaHotrim (IL)

( * ) Notice: Subject to any disclaimer, the term of this patent is extended or adjusted under 35 U.S.C. 154(b) by 517 days.

(21) Appl. No.: 12/096,288

(22) PCT Filed: Dec. 7, 2006

(86) PCT No.: PCT/IB2006/003523
§ 371 (c)(1),
(2), (4) Date: Jun. 30, 2008

(87) PCT Pub. No.: WO2007/066212
PCT Pub. Date: Jun. 14, 2007

(65) Prior Publication Data
US 2008/0307802 A1  Dec. 18, 2008

Related U.S. Application Data

(60) Provisional application No. 60/748,123, filed on Dec. 7, 2005.

(51) Int. Cl.
*F25D 17/06* (2006.01)
(52) U.S. Cl. .............................. 62/94; 62/271
(58) Field of Classification Search .......... 62/78, 94, 62/271, 515, 176.6, 121, 314, 331; 165/222, 165/226; 261/131, 140.2, 154; 454/54, 55, 454/110
See application file for complete search history.

(56) References Cited

U.S. PATENT DOCUMENTS

| 2,672,024 A | 3/1954 | McGrath |
| 2,798,570 A | 7/1957 | Kelley |
| 2,935,154 A | 5/1960 | Kelley |
| 3,018,231 A | 1/1962 | Valentine et al. |
| 3,266,784 A | 8/1966 | Saito |

(Continued)

FOREIGN PATENT DOCUMENTS

EP  1 510 768 A1  3/2005

(Continued)

OTHER PUBLICATIONS

Roland V. Wahlgren, Atmospheric Water Vapour Processor Designs for Potable Water Production: A Review; Wat. Res. vol. 35, No. 1, pp. 1-22, 2001.

*Primary Examiner* — Mohammad Ali
(74) *Attorney, Agent, or Firm* — Brooks Kushman P.C.

(57) ABSTRACT

A system and method for managing water content in a fluid includes a collection chamber for collecting water from the fluid with a desiccant, and a regeneration chamber for collecting water from the desiccant and transferring it to a second fluid. An evaporator cools the desiccant entering the collection chamber, and a second evaporator cools the second fluid to extract the water. The evaporators use a refrigerant, the flow of which is controlled by a flow control valve. When the temperature in the second evaporator drops below a set point, the refrigerant flow to the second evaporator is stopped, and the refrigerant flow to the first evaporator is increased. This increases the water collection in the collection chamber, and causes a rise in the temperature in the second evaporator. The valve is then opened to increase the cooling in the second evaporator.

13 Claims, 2 Drawing Sheets

U.S. PATENT DOCUMENTS

| | | | |
|---|---|---|---|
| 4,134,743 A | 1/1979 | Macriss et al. | |
| 4,171,624 A | 10/1979 | Meckler et al. | |
| 4,180,985 A | 1/1980 | Northrup, Jr. | |
| 4,197,713 A | 4/1980 | Bulang | |
| 4,299,599 A | 11/1981 | Takeyama et al. | |
| 4,312,640 A | 1/1982 | Verrando | |
| 4,313,312 A | 2/1982 | Ito et al. | |
| 4,365,979 A | 12/1982 | Takeyama et al. | |
| 4,398,927 A | 8/1983 | Asher et al. | |
| 4,527,398 A | 7/1985 | Schaetzle | |
| 4,783,432 A | 11/1988 | Settlemyer | |
| 4,832,711 A | 5/1989 | Christel et al. | |
| 4,860,548 A | 8/1989 | Ryham | |
| 4,939,906 A | 7/1990 | Spatz et al. | |
| 4,941,324 A | 7/1990 | Peterson et al. | |
| 4,955,205 A | 9/1990 | Wilkinson | |
| 5,020,335 A * | 6/1991 | Albers et al. | 62/271 |
| 5,097,668 A | 3/1992 | Albers et al. | |
| 5,191,771 A | 3/1993 | Meckler | |
| 5,233,843 A | 8/1993 | Clarke | |
| 5,448,895 A | 9/1995 | Coellner et al. | |
| 5,669,221 A | 9/1997 | LeBleu et al. | |
| 5,699,673 A | 12/1997 | Hoshino et al. | |
| 5,817,167 A | 10/1998 | DesChamps | |
| 5,845,504 A | 12/1998 | LeBleu | |
| 5,857,344 A | 1/1999 | Rosenthal | |
| 5,953,926 A * | 9/1999 | Dressler et al. | 62/175 |
| 6,018,954 A | 2/2000 | Assaf | |
| 6,058,718 A | 5/2000 | Forsberg et al. | |
| 6,134,903 A | 10/2000 | Potnis et al. | |
| 6,182,453 B1 | 2/2001 | Forsberg | |
| 6,199,389 B1 | 3/2001 | Maeda | |
| 6,226,888 B1 | 5/2001 | Lang | |
| 6,230,503 B1 | 5/2001 | Spletzer | |
| 6,251,172 B1 | 6/2001 | Conrad | |
| 6,336,957 B1 | 1/2002 | Tsymerman | |
| 6,453,684 B1 | 9/2002 | Spletzer et al. | |
| 6,463,750 B2 | 10/2002 | Assaf | |
| 6,481,222 B1 | 11/2002 | Denniston | |
| 6,487,872 B1 | 12/2002 | Forkosh et al. | |
| 6,494,053 B1 | 12/2002 | Forkosh et al. | |
| 6,511,525 B2 | 1/2003 | Spletzer et al. | |
| 6,514,321 B1 | 2/2003 | Lehto et al. | |
| 6,546,746 B2 | 4/2003 | Forkosh et al. | |
| 6,821,443 B2 | 11/2004 | Kim | |
| 6,863,711 B2 | 3/2005 | Tongue et al. | |
| 6,869,464 B2 | 3/2005 | Klemic | |
| 6,976,365 B2 * | 12/2005 | Forkosh et al. | 62/94 |
| 7,043,934 B2 | 5/2006 | Radermacher et al. | |
| 7,269,966 B2 * | 9/2007 | Lowenstein et al. | 62/271 |
| 7,306,650 B2 * | 12/2007 | Slayzak et al. | 95/91 |
| 7,430,878 B2 * | 10/2008 | Assaf | 62/314 |
| 2001/0015072 A1 | 8/2001 | Assaf | |
| 2001/0015077 A1 | 8/2001 | Potnis et al. | |
| 2002/0116935 A1 * | 8/2002 | Forkosh et al. | 62/93 |
| 2003/0014983 A1 * | 1/2003 | Maisotsenko et al. | 62/121 |
| 2003/0221438 A1 * | 12/2003 | Rane et al. | 62/271 |
| 2004/0112077 A1 * | 6/2004 | Forkosh et al. | 62/271 |
| 2004/0168462 A1 | 9/2004 | Assaf | |
| 2004/0194478 A1 | 10/2004 | Maeda et al. | |
| 2004/0211207 A1 * | 10/2004 | Forkosh et al. | 62/271 |
| 2004/0231512 A1 * | 11/2004 | Slayzak et al. | 95/211 |
| 2004/0261440 A1 * | 12/2004 | Forkosh et al. | 62/271 |
| 2005/0109052 A1 * | 5/2005 | Albers et al. | 62/271 |
| 2005/0236145 A1 | 10/2005 | Arai et al. | |
| 2006/0130654 A1 * | 6/2006 | King et al. | 95/231 |
| 2007/0101862 A1 * | 5/2007 | Tongue | 95/231 |

FOREIGN PATENT DOCUMENTS

| | | |
|---|---|---|
| FR | 2574908 A1 | 6/1986 |
| WO | 96/33378 A1 | 10/1996 |
| WO | 0055546 | 9/2000 |
| WO | 02066901 A1 | 8/2002 |
| WO | 02086391 A1 | 10/2002 |
| WO | 03056249 A1 | 7/2003 |
| WO | 2004046618 A1 | 6/2004 |
| WO | 2005057114 A1 | 6/2005 |
| WO | 2006026494 A1 | 3/2006 |
| WO | 2006129200 A2 | 12/2006 |

* cited by examiner

SYSTEM AND METHOD FOR MANAGING WATER CONTENT IN A FLUID

CROSS-REFERENCE TO RELATED APPLICATIONS

This application claims the benefit of U.S. Provisional Application Ser. No. 60/748,123, filed 7 Dec. 2005, which is hereby incorporated herein by reference.

BACKGROUND OF THE INVENTION

1. Field of the Invention

The present invention relates a system and method for managing water content in a fluid.

2. Background Art

Conventionally, water is collected from air, or other gaseous fluids, using condensation systems. An exemplary condensation system provides a surface cooled to a temperature that is at or below the dew point of incoming air. As is well known in the art, the cooling of air at or below its dew point causes the condensation of water vapor from the air and a decrease in the absolute humidity of the air. The humidity of a volume of air is substantially determinative of the amount of water that can be introduced into, or removed from, the volume of air.

Conventional water generation and removal systems collect water vapor from incoming airflows using condensation systems that lower the temperature of incoming air to a temperature that is at or below the dew point of the air. Therefore, the quantity of water produced by such systems depends on the humidity of the ambient air. The humidity and temperature of air varies, however, from region to region, with hot and humid air in tropical and semitropical regions, and cooler, less humid air in other parts of the world. The temperature and water vapor content of air also varies widely with seasonal weather changes in regions throughout the year. Therefore, depending on the region of the world, and depending on the time of year, humidification or dehumidification may be desirable, for example, to make an environment more comfortable.

In addition to increasing comfort, management of the amount of water in air may be important to industrial applications. Moreover, it may be desirable to remove water from air so that the water can be utilized, for example, for drinking, or in other applications where fresh water is desired. Regardless of the reason for managing the amount of water in the air, there are times when conventional water management systems have undesirable limitations. For example, when the dew point of the air is low, particularly when it is below the freezing point of water, it may be difficult or impossible to remove the water using a conventional system. The use of a desiccant material may be effective to remove water from air or other fluid streams in such situations. Conventional systems utilizing desiccants do not account for changes in environmental conditions—e.g., changing temperature and humidity of the fluid stream—which may adversely affect the efficiency of the system.

Therefore, there is a need for a system and method for managing the water content in a fluid that can extract water from the fluid even when the dew point is low. There is also a need for a system and method for managing water content in a fluid that can control desiccant parameters to maintain system efficiency, for example, in light of changing environmental conditions.

SUMMARY OF THE INVENTION

Embodiments of the present invention provide a system and method for removing water from a fluid even when the dew point is low.

Embodiments of the invention also provide a system and method for removing water from a fluid using a desiccant having at least one parameter which can be controlled to modify the water removal capacity of the desiccant and maintain system efficiency in light of changing environmental conditions.

Embodiments of the invention further provide a system for managing water content in a fluid. The system includes a first chamber having an inlet and an outlet for facilitating movement of a first fluid into and out of the first chamber. A desiccant is capable of being introduced into the first chamber for removing water from the first fluid moving through the first chamber. A second chamber is configured to receive at least a portion of the desiccant after it removes water from the first fluid. The second chamber includes an inlet and an outlet for facilitating movement of a second fluid into and out of the second chamber. This facilitates evaporation of water from the desiccant into the second fluid, thereby increasing water content in the second fluid. A system heat exchanger is configured to receive a third fluid therethrough, and to receive the second fluid from the second chamber to facilitate a transfer of heat from the second fluid to the third fluid. This facilitates removal of water from the second fluid. A valve is operable to control the flow of the third fluid through the system heat exchanger. A sensor is in communication with the valve, and is configured to sense a parameter of the second fluid after its water content is increased. The sensor is configured to output signals to the valve related to the sensed parameter. This effects control of the flow of the third fluid through the system heat exchanger based on the sensed parameter.

The system can also include a first heat exchanger configured to receive the third fluid therethrough and to cool the desiccant before it is introduced into the first chamber. The first heat exchanger is arranged with the valve such that a reduction in flow of the third fluid through the valve increases the flow of the third fluid through the first heat exchanger. This increases the cooling capacity of the first heat exchanger.

Embodiments of the invention further provide a system for managing water content in a fluid. The system includes a first chamber having an inlet and an outlet for facilitating movement of a first fluid into and out of the first chamber. A desiccant is capable of being introduced into the first chamber for removing water from the first fluid moving through the first chamber. A second chamber is configured to receive at least a portion of the desiccant after it removes water from the first fluid. The second chamber includes an inlet and an outlet for facilitating movement of a second fluid into and out of the second chamber. This facilitates evaporation of water from the desiccant into the second fluid, thereby increasing water content in the second fluid. A heat exchanger arrangement having a controllable heat exchange capacity is configured to receive the second fluid from the second chamber to facilitate cooling of the second fluid. This facilitates removal of water from the second fluid. A sensor is configured to sense a parameter of the second fluid after its water content is increased, and is capable of outputting signals related to the sensed parameter. A control system, including at least one controller, is in communication with the heat exchanger arrangement and the sensor. The control system is configured to receive signals from the sensor and to effect control of the heat exchange capacity of the heat exchanger arrangement based at least in part on the signals received.

Embodiments of the invention further provide a method for managing water content in a fluid using a system which includes a desiccant and a system heat exchanger. The method includes removing water from a first fluid using a process that includes exposing at least some of the first fluid to the desiccant. This increases the water content of at least some of the desiccant. At least some of the desiccant having increased water content is introduced into a second fluid, thereby facilitating evaporation of water from the desiccant into the second fluid and increasing water content of the second fluid. The second fluid is passed through the system heat exchanger after the water content of the second fluid is increased. This facilitates cooling of the second fluid and removal of water therefrom. A parameter of the second fluid is sensed after its water content is increased, and the heat exchange capacity of the system heat exchanger is controlled at least partly based on the sensed parameter.

Embodiments of the present invention also provide a system and method for passing ambient air into a first chamber having a suitable desiccant material therein. The desiccant absorbs or adsorbs moisture from the air that comes in contact with the desiccant. In one embodiment, the air contacts desiccant by pumping air through a contact surface, such as a sponge, media, cooling coil, or cooling tower, that has desiccant dispersed therein. The desiccant and/or first chamber may be cooled to enable the more efficient transfer of water from the air to the desiccant. The desiccant absorbs or adsorbs water from the air, thereby transferring latent heat from the air as the water undergoes a phase change and condenses out of the air. Because the desiccant and/or first chamber are cooled, sensible cooling—i.e., cooling that is not based on a change of state—is also provided to the air. The resulting dry, cooled air is drawn out from the first chamber.

The now hydrous desiccant collects at the bottom of the first chamber and gets transferred to a second chamber. The second chamber transfer occurs either through active pumping or diffusion via a valve opening provided in a partition between the first and the second chambers. The valve opening enables equalization of desiccant levels in the first and the second chamber. The net flow of hydrous desiccant occurs from the first chamber to the second chamber until the level of the desiccant equalizes in the two chambers. The diffused or pumped hydrous desiccant in the second chamber can be heated and then again exposed to air.

The desiccant can be introduced into the chambers by any method effective to achieve the desired result. For example, the first chamber may include spongy cellulose material through which the hydrated desiccant percolates down to collect at the bottom of the chamber. Alternatively, the desiccant is made to simply drip in the form of drops from points within, such as the top of, the first and second chambers. In one embodiment, the desiccant is sprayed into the interior of the second chamber. A heat exchanger such as a heating element warms the spray of hydrous desiccant falling from the nozzles, thereby evaporating moisture absorbed or adsorbed into the desiccant, generating hot humid air, and also regenerating substantially anhydrous desiccant.

The hot, humid air leaving the second chamber can be directed to contact the dew-forming surfaces of a heat absorber, such as an evaporator, that are cooled using a suitable cooling process such as classic boiling fluids contained in tubes, thermoelectric elements, heat pipes, refrigerant-expansion coils or any other system known to persons of ordinary skill in the art. A parameter of the hot, humid air can be sensed—e.g., the humidity or the temperature, and the heat absorbing capacity of the evaporator can be appropriately controlled. For example, if the sensed temperature drops below a set point, the heat absorbing capacity of the evaporator can be reduced. At the same time, the desiccant entering the first chamber can be further cooled, for example, by increasing the heat absorbing capacity of a heat exchanger through which the desiccant is passed. This will ultimately lead to an increased load in the evaporator, which will cause the temperature to rise above the set point, thereby leading to an increase in the heat absorbing capacity of the evaporator. In this way, changing environmental conditions are accounted for, and the overall efficiency of the system is increased.

At least one embodiment of the present invention can sterilize and filter the condensed water to generate pure drinking water. Accordingly, in one embodiment, condensed water from the condensate collector is exposed to suitable ultraviolet (UV) radiation in a UV unit to free the water from harmful microscopic organisms. Additionally, the radiated water is serially passed through a charcoal filter to remove contaminants and Volatile Organic Compounds (VOC's) and a plurality of mineral cartridges to mineralize and/or vitaminize the water. The purified and mineralized water is collected in a first storage tank. Additionally, the water is passed through an oxygenator before being stored in the first storage tank. Water from the first storage tank is recirculated through the UV unit at predetermined intervals of time to maintain quality of water.

At least one embodiment of the present invention can also dispense hot and cold water. Thus, in one embodiment, water from the first storage tank is gravity fed into a second cold storage tank from where it is further gravity fed into a third hot storage tank. Water in the second storage tank is chilled using a suitable cooling process such as Peltier-effect or chemical/magnetic cooling, by the use of a typical expansion-evaporation coils, or by any other method effective to achieve the desired result. The cold water is then dispensed through a first childproof spigot. Also, water in the third tank is heated to a desired temperature by a heating element and dispensed through a second spigot. Ambient temperature water is dispensed from the second spigot when power is disallowed to the heating element of the third tank. In another embodiment, water from the first storage tank can be directly dispensed through a third spigot to provide water at ambient temperature.

Embodiments of the present invention may also be configured to provide for the introduction of water from external sources in the event of low condensate formation. Accordingly, an external source such as a municipal supply faucet is attached through quick-disconnect fittings to supply supplemental water to the first storage tank.

DETAILED DESCRIPTION OF THE PREFERRED EMBODIMENT(S)

Figure 1:
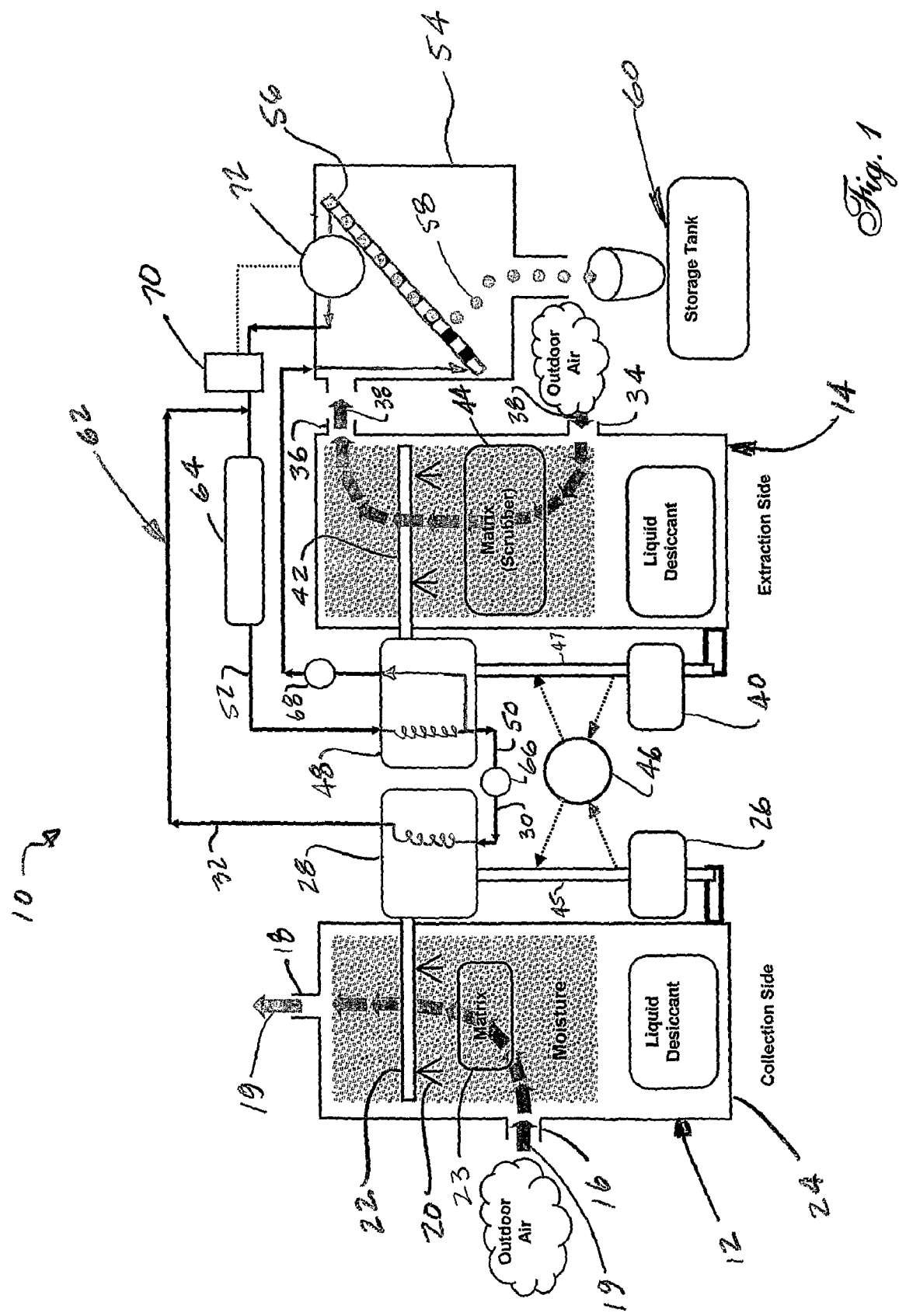
FIG. 1 shows a schematic diagram of a system for managing water content in a fluid in accordance with one embodiment of the present invention.

FIG. 1 shows a system 10 for managing water content in a fluid in accordance with one embodiment of the present invention. In particular, the system 10 is configured to manage the water content in air—either to collect water from the air for storage and subsequent use, or to control the humidity of the air. It is worth noting that although the examples presented herein utilize ambient air as the fluid whose water content is being managed, the present invention is capable of managing the water content of other fluids as well—e.g., gases, liquids, or some combination thereof. The system 10 includes a first chamber, or collection chamber 12, and a second chamber, or regeneration chamber 14. The collection chamber 12 includes an inlet 16 and an outlet 18 which allow a first airflow 19 to flow through the collection chamber 12. As the air flows through the collection chamber 12, it contacts a desiccant 20, which, in the embodiment shown in FIG. 1, is sprayed into the chamber 12 via a conduit 22.

As the air moves through the collection chamber 12, vaporized water is condensed out, and collects with the desiccant 20 in the bottom portion 24 of the chamber 12. The desiccant 20 is diluted as it adsorbs or absorbs the water from the air. Although the desiccant 20 shown in FIG. 1 is all liquid, the present invention contemplates the use of solid desiccants, or dual phase desiccants—e.g., solid and liquid. Any desiccant material effective to produce the desired result may be used, including solids, liquids, solutions, aqueous solutions, mixtures, and combinations thereof. Lithium chloride (LiCl) and calcium chloride (CaCl2) are typical of liquid desiccant solutions, but other liquid desiccants may be employed.

Liquid desiccants such as polycols, alone or in mixture, may be used. Typical polycols include liquid compounds such as ethylene glycol, propylene glycol, butylene glycol, pentylene glycol, glycerol, trimethyol propane, diethylene glycol, triethylene glycol, tetraethylene glycol, dipropylene glycol, tripropylene glycol, tetrapropylene glycol, and mixtures thereof. Polyol compounds which are normally solid, but which are substantially soluble in anhydrous liquid polyols or liquid hydroxyl amines, may also be used. Typical of these solid polyol compounds are erythritol, sorbitol, pentaerythritol and low molecular weight sugars. Typical hydroxyl amines include alkanolamines, such as monoethanol amine, diethanol amine, triethanol amine, isopropanol amine, including mono, di, and tri, isopropanol amine or digylcolamine.

Still other types of desiccants such as montmorillonite clay, silica gel, molecular sieves, CaO, CaSO4 can all be used. As would be evident to persons of ordinary skill in the art, the selection of a desirable desiccant depends, among other parameters, upon the temperature and humidity ranges of ambient air from which moisture is to be absorbed. Still other exemplary desiccants comprise materials such as P2O5, BaO, Al2O3, NaOH sticks, KOH fused, CaBr2, ZnCl2, Ba(ClO4)2, ZnBr2.

As noted above, the desiccant 20 is a liquid desiccant, which may comprise an aqueous solution of 40% lithium chloride. Inside the collection chamber 12 is a matrix material 23. The matrix 23 can be a sponge or other medium or media effective to facilitate contact between the desiccant 20 and the air flowing through the collection chamber 12. The desiccant 20 is pumped into the conduit 22 by a pump 26. The pump 26 pumps the desiccant 20 through a first heat exchanger 28 prior to its introduction into the collection chamber 12. By cooling the desiccant 20, its ability to remove water from the first airflow 19 is increased. A fluid, such as a refrigerant, is passed through the heat exchanger 28 via conduits 30, 32. The desiccant 20 is cooled in the heat exchanger 28 to a temperature below that of the first airflow 19 In this way, the airflow 19 is cooled as it passes through the collection chamber 12. As an alternative to the heat exchanger 28, a heat exchanger may be placed inside the collection chamber 12 to cool the first airflow 19 directly, or to cool the desiccant 20 after it is sprayed into the collection chamber 12.

The regeneration chamber 14 also includes an inlet 34 and an outlet 36, which facilitate movement of a second airflow 38 into and out of the regeneration chamber 14. As with the collection chamber 12, the regeneration chamber 14 also includes a pump 40 which is used to pump the desiccant 20 into the regeneration chamber 14 through a conduit 42. The desiccant 20 is sprayed into the regeneration chamber 14 to contact a matrix 44, which, like the matrix 23, may be a sponge or other medium or media.

Between the two chambers 12, 14 is a flow controller 46, which can be an electronic valve, operable to allow the hydrous desiccant from the collection chamber 12 to mix with desiccant in the regeneration chamber 14, and vice versa. Instead of the valve 46, other flow control devices may be used to control the flow of desiccant between the two chambers 12, 14. For example, a partition may be used for equalization in concentration of the desiccant 20, which can be achieved through osmotic flow. In this way, the desiccant 20 in the collection chamber 12 is not rapidly diluted and rendered ineffective.

The pumps 26, 40 can pump the desiccant 20 into their respective chambers 12, 14 through respective conduits 45, 47. Alternatively, some or all of the desiccant 20 can be pumped from one of the chambers 12, 14, to the other of the chambers 12, 14 through the flow controller 46. In some embodiments of the present invention, a flow controller, such as the flow controller 46, can have two inlets connected directly to respective pump outlets, and two outlets connected directly to respective heat exchanger inlets, thereby eliminating the need for conduits 45, 47. In some embodiments, the flow through the valve 46 is much less than the flow through the respective conduits 45, 47. For example, if the pumps 26, 40 have a flow rate of 200 liters per minute (lpm), the flow through the valve 46 may be 100 liters per hour (lph). Thus, only a fraction of the fluid pumped by the pumps 26, 40 is pumped into the opposite chamber 14, 12, respectively. Conversely, other embodiments of the present invention may have pumps and flow controllers with different flow rates—both in terms of absolute flow rates and in terms of flow rates relative to each other.

As shown in FIG. 1, the desiccant 20 is pumped by the pump 40 through a second heat exchanger 48. Heat can be added to the heat exchanger 48 from any convenient source, via conduits 50, 52. By passing through the heat exchanger 48, the desiccant 20 is heated to a temperature above the temperature of the second airflow 38, so that the second airflow 38 is heated as it passes through the regeneration chamber 14. By heating the second airflow 38, more water is evaporated from the desiccant 20 into the second airflow 38. As an alternative to the heat exchanger 48, which is located outside the regeneration chamber 14, a heat exchanger (not shown) may be located inside the regeneration chamber 14.

Use of the system 10 results in two separate airflows exiting the chambers 12, 14. The first airflow 19 of now dry air exits the collection chamber 12 through the outlet 18, and the second airflow 38 of now humid air exits the regeneration chamber 14 through the outlet 36. One of ordinary skill in the art will appreciate that the extraction of water from the first airflow 19 increases the latent heat of the desiccant 20, and results in latent cooling of the first airflow 19. Additionally, because the desiccant 20 (or alternatively the chamber 12, or both) is cooled, the first airflow 19 itself undergoes sensible cooling that lowers its temperature level, thereby creating cooled, dry air. In one embodiment, the present invention uses 10 liters of lithium chloride solution to extract 2 liters per hour of moisture from incoming air that is provided by an air blower rated at 250 m$^3$/hour. The result is a sensible cooling capacity of 0.7 kilowatts (kW) and a latent cooling capacity of 1.4 kW, thereby enabling a temperature reduction in the air of 8.4° C.

The warm, humid air 38 leaving the regeneration chamber 14 can be introduced into a system heat exchanger, or evaporator 54. The evaporator 54 includes a contact surface 56, which causes water 58 to condense out of the humid air stream 38. The water 58 may be collected in a storage tank 60 for later use. Depending on the use intended for the water 58, it can be sterilized and/or treated using a secondary system, or by expanding the system 10 to include such elements. One such system is described in International Patent Application PCT/US05/30529 filed on 26 Aug. 2005, entitled "System and Method for Producing Water," which is hereby incorporated herein by reference.

The evaporator 54 is part of a refrigeration subsystem 62, which includes the first and second heat exchangers 28, 48. The first and second heat exchangers 28, 48 respectively act as an evaporator and condenser within the subsystem 62. A third fluid, or refrigerant, is pumped through the subsystem 62 by a compressor 64, while throttling devices 66, 68 facilitate expansion of the refrigerant before it reaches a respective evaporator 28, 54.

To selectively control the flow of the refrigerant through the evaporators 28, 54, a control valve 70 is used. The control valve 70 is in communication with a sensor 72 at least partly disposed within the evaporator 54. The sensor 72 is configured to sense a parameter of the second airflow 38 after it has picked up water in the regeneration chamber 14. For example, the sensor 72 can be a hygrometer or other device capable of measuring the humidity of the airflow 38, which may be convenient when the system 10 is used as a dehumidifier. Alternatively, the sensor 72 can be a temperature sensor configured to sense a temperature of the airflow 38, which may be convenient when the system 10 is used to produce water. In any case, the sensor 72 can output signals related to the sensed parameter to control the valve 70.

In the embodiment shown in FIG. 1, the sensor 72 is configured to sense the temperature of the airflow 38 in the evaporator 54. When the valve 70 is open, thereby allowing refrigerant to flow through the evaporator 54, the evaporator 54 cools the airflow 38. The sensor 72 is configured such that when the sensed temperature drops to a predetermined set point—e.g., 3° C.—the sensor 72 signals the valve 70 to close. This stops the refrigerant from flowing through the evaporator 54, and increases the amount of refrigerant flowing through the other evaporator, or first heat exchanger 28. In this way, the heat absorbing capacity of the evaporator 54 is reduced—i.e., its cooling capacity is reduced—while the heat absorbing capacity of the evaporator 28 is increased. The increased cooling of the desiccant 20 entering the collection chamber 12 results in more water being absorbed from the first airflow 19, and thereby increases the vapor pressure of the desiccant 20. In other embodiments, a sensor, such as the sensor 72, can include a hygrometer, configured to measure the humidity of the airflow 38. In such embodiments, a sensed humidity at or below a set point humidity can cause signals to be sent to close the valve 70, again reducing the cooling capacity of the evaporator 54 and automatically increasing the cooling capacity of the evaporator 28.

In situations where the moisture content in the airflows 19, 38 is low, the set point—temperature or humidity—will quickly be reached, and the desiccant 20 entering the collection chamber 12 will receive increased cooling. This results in an increase in the amount of water collected in the collection chamber 12 and subsequently transferred to the regeneration chamber 14 through the flow controller 46. This, in turn, causes a higher load in the regeneration chamber 14, and ultimately, an increase in the temperature sensed by the sensor 72. In order to keep the valve 70 from constantly cycling between open and shut, a hysteresis can be built in to the system 10. In this way, the valve 70 may be shut when the sensed temperature is at one set point, but it may not be opened until the sensed temperature reaches another set point, slightly higher than the first set point.

Figure 2:
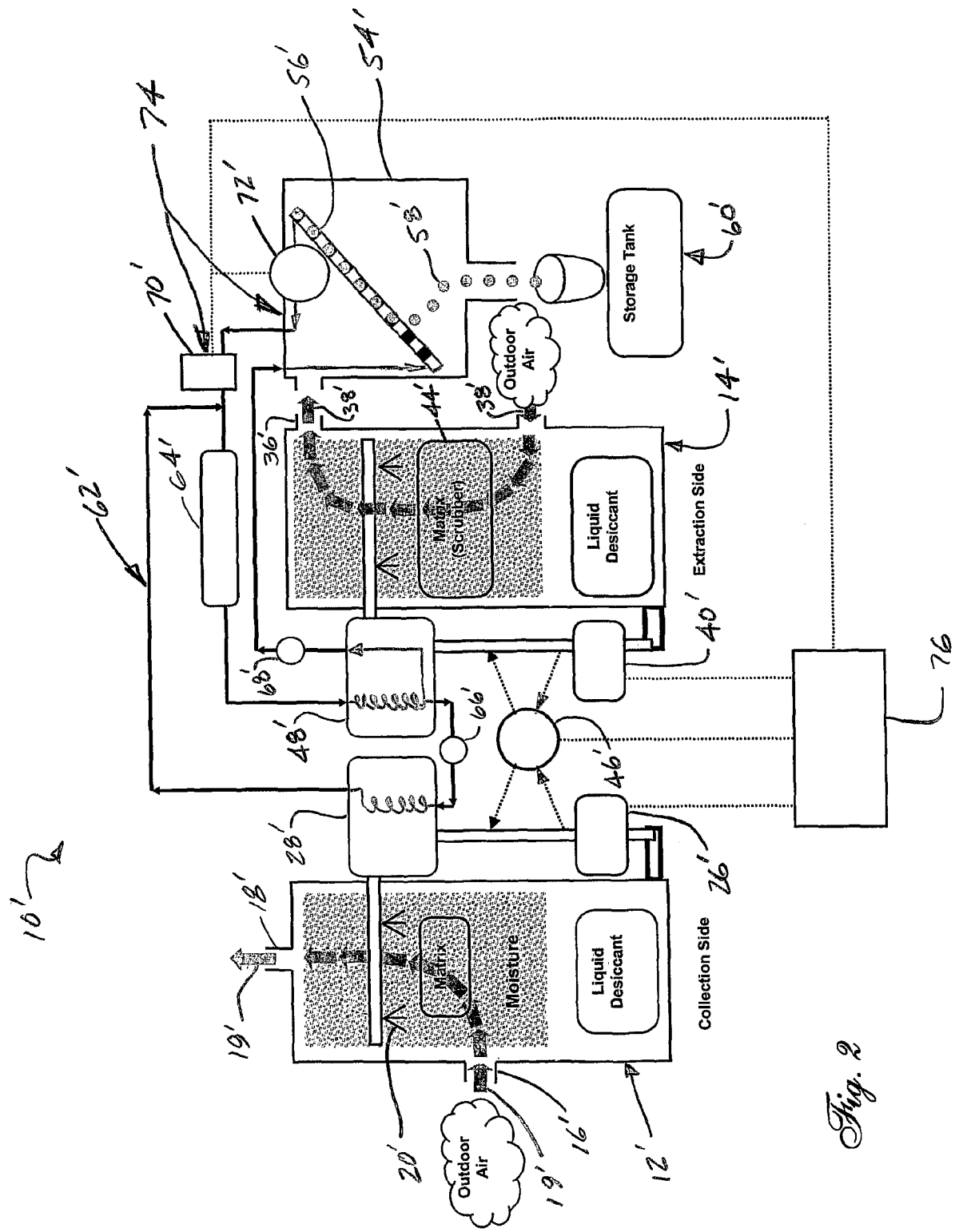
FIG. 2 shows a schematic diagram of a system for managing water content in a fluid in accordance with another embodiment of the present invention.

In the system 10, either or both of the sensor 72 and the valve 70 may include one or more controllers which can be programmed, for example, with temperature or humidity set points. In addition, the flow controller 46 can be programmed to appropriately manage the flow of the desiccant 20 between the collection and regeneration chambers 12, 14. Thus, the system 10 includes a control system made up of independently operating controllers. Alternatively, a system controller can be used to coordinate the functions of the various elements of the system; such a system is illustrated in FIG. 2. In FIG. 2, the prime symbol (') has been used to identify elements which are related to those found in the system 10 shown in FIG. 1.

FIG. 2 illustrates a system 10' for managing the water content in air. As with the system 10, shown in FIG. 1, the system 10' includes collection and regeneration chambers 12', 14', each of which has its own heat exchanger 28', 48' for controlling the temperature of the desiccant 20'. The heat exchangers 28', 48' are part of a refrigeration subsystem 62'. The refrigeration subsystem 62' also includes a heat exchanger arrangement 74, which includes a heat exchanger, or evaporator 54', and a refrigerant flow valve 70'. Although the evaporator 54' is shown separately from the flow control valve 70', it is understood that they can be integrated into a single device, which can also include a sensor 72' Similar to the sensor 72, shown in FIG. 1, the sensor 72' is configured to sense a parameter of the airflow 38'—e.g., temperature, humidity, etc.—and to output signals related to the sensed parameter.

Rather than relying on a number of independent controllers, the system 10' includes a system controller 76, which communicates with other controllers—e.g., the flow controller 46' and a controller or controllers within the valve 70' and the sensor 72'—to make up a control system. As shown in FIG. 2, the system controller 76 can be used to control other elements of the system 10', such as pumps 26', 40'. This configuration may conveniently provide a centralized control of the various elements in a system, such as the system 10. Similar to the system 10, shown in FIG. 1, the system 10' can function to modify the heating or cooling capacities of various system elements to accommodate changing environmental conditions.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for managing water content in a fluid, comprising:
 a first chamber having an inlet and an outlet for facilitating movement of a first fluid into and out of the first chamber;
 a desiccant capable of being introduced into the first chamber for removing water from the first fluid moving through the first chamber;

a second chamber configured to receive at least a portion of the desiccant after it removes water from the first fluid, the second chamber including an inlet and an outlet for facilitating movement of a second fluid into and out of the second chamber, thereby facilitating evaporation of water from the desiccant in the second chamber into the second fluid and increasing the water content of the second fluid;

a system heat exchanger configured to receive a third fluid therethrough, and to receive the second fluid from the second chamber to facilitate a transfer of heat from the second fluid to the third fluid, thereby facilitating removal of water from the second fluid;

a valve operable to vary the flow of the third fluid;

a sensor configured to sense a parameter of the second fluid after its water content is increased and to output signals related to the sensed parameter to effect control of the valve to control the flow of the third fluid through the system heat exchanger based on the sensed parameter; and a first heat exchanger configured to receive the third fluid therethrough and to cool the desiccant before it is introduced into the first chamber, the first heat exchanger being arranged with the valve such that a reduction in flow of the third fluid through the valve increases the flow of the third fluid through the first heat exchanger, thereby increasing the cooling capacity of the first heat exchanger.

2. The system of claim 1, wherein the sensor is in communication with the valve, and the signals related to the sensed parameter are output by the sensor to the valve.

3. The system of claim 1, further comprising:

a heat exchanger arrangement including the system heat exchanger and the valve; and a control system, including at least one controller, in communication with the heat exchanger arrangement and the sensor, the control system being configured to receive signals from the sensor and to effect operation of the valve to adjust the cooling capacity of the system heat exchanger.

4. The system of claim 3, the desiccant being at least partially fluid, the system further comprising:

a pair of pumps for respectively pumping desiccant into the first and second chambers; and a flow controller disposed between the first and second chambers and operable to facilitate exchange of desiccant between the chambers, the control system being further configured to control operation of the pumps and the flow controller.

5. The system of claim 1, wherein the sensor includes a temperature sensor, the signals output by the sensor effecting a closing of the valve when the temperature sensed is at or below a first set point temperature.

6. The system of claim 1, wherein the sensor includes a hygrometer, the signals output by the sensor effecting a closing of the valve when the humidity sensed is at or below a first set point humidity.

7. The system of claim 1, further comprising a second heat exchanger configured to receive the third fluid therethrough and to add heat to the desiccant before it is introduced into the second chamber, the second heat exchanger being arranged with the valve such that a reduction in flow of the third fluid through the valve increases the flow of the third fluid through the second heat exchanger, thereby increasing the heating capacity of the second heat exchanger.

8. A method for managing water content in a fluid using a system including a desiccant and a system heat exchanger, the method comprising:

removing water from a first fluid using a process that includes exposing at least some of the first fluid to the desiccant, thereby increasing the water content of at least some of the desiccant, the first process further including passing the desiccant through a first heat exchanger to cool the desiccant before the first fluid is exposed to it, thereby increasing the amount of water removed from the first fluid;

introducing at least some of the desiccant having increased water content into a second fluid, thereby facilitating evaporation of water from the desiccant into the second fluid and increasing water content of the second fluid;

passing the second fluid through the system heat exchanger after the water content of the second fluid is increased, thereby facilitating cooling of the second fluid and removal of water therefrom;

sensing a parameter of the second fluid after its water content is increased; and adjusting the cooling capacity of the system heat exchanger at least partly based on the sensed parameter such that the cooling capacity of the first heat exchanger is automatically adjusted, wherein the step of adjusting the cooling capacity of the system heat exchanger includes increasing the cooling capacity of the system heat exchanger such that the cooling capacity of the first heat exchanger is automatically decreased.

9. The method of claim 8, wherein the step of sensing a parameter of the second fluid includes sensing a humidity of the second fluid, the cooling capacity of the system heat exchanger being reduced when the sensed humidity is at or below a first set point humidity.

10. The method of claim 8, wherein the step of sensing a parameter of the second fluid includes sensing a temperature of the second fluid, the cooling capacity of the system heat exchanger being reduced when the sensed temperature is at or below a first set point temperature.

11. The method of claim 8, wherein the step of adjusting the cooling capacity of the system heat exchanger includes reducing the cooling capacity of the system heat exchanger such the cooling capacity of the first heat exchanger is automatically increased.

12. The method of claim 8, further comprising heating the desiccant before the desiccant is introduced into the second fluid, thereby increasing the amount of water evaporated from the desiccant into the second fluid.

13. The method of claim 11, wherein the step of heating the desiccant before the desiccant is introduced into the second fluid includes passing the desiccant through a second heat exchanger that cooperates with the system heat exchanger such that when the cooling capacity of the system heat exchanger is reduced, the heating capacity of the second heat exchanger is automatically increased.

* * * * *